United States Patent [19]

Simpson

[11] Patent Number: 4,724,823
[45] Date of Patent: Feb. 16, 1988

[54] RADIANT GAS BURNER ASSEMBLY

[75] Inventor: Thomas W. Simpson, Rochester, Mich.

[73] Assignee: Solaronics, Inc., Rochester, Mich.

[21] Appl. No.: 912,571

[22] Filed: Sep. 29, 1986

[51] Int. Cl.[4] ............................................. F24C 3/00
[52] U.S. Cl. ................................. 126/39 R; 126/39 E; 126/39 H; 126/39 D; 99/422; 99/447; 431/1
[58] Field of Search ................ 126/52, 39 R, 39 BA, 126/39 D, 39 E, 39 H, 39 N, 39 J, 39 K, 214 A, 214 R; 99/422, 447; 431/1

[56] References Cited

U.S. PATENT DOCUMENTS

| | | | |
|---|---|---|---|
| 3,489,133 | 1/1970 | Kells et al. ......................... | 126/39 R |
| 3,837,329 | 9/1974 | Mutchler ........................ | 126/39 J X |
| 4,201,184 | 5/1980 | Scheidler et al. .................... | 126/39 J |
| 4,569,328 | 2/1986 | Shukla et al. ................... | 126/39 R X |
| 4,570,610 | 2/1986 | Himmel ......................... | 126/39 R X |
| 4,580,550 | 4/1986 | Kristen et al. ................ | 126/39 R X |

*Primary Examiner*—Larry Jones
*Attorney, Agent, or Firm*—Krass & Young

[57] ABSTRACT

A gas fired radiant griddle assembly employing a series of perforated ceramic tiles to define a burner surface positioned beneath the griddle. The center area of the assembled ceramic tiles is blocked off so as to define an annular burner surface to minimize the temperature gradient across the griddle surface and the hot combustion effluents are drawn by convection beneath the griddle surface and out the rear corners of the combustion chamber beneath the griddle to heat the peripheral and corner portions of the griddle and further minimize the temperature gradient across the expanse of the griddle.

18 Claims, 8 Drawing Figures

IFig-8

RADIANT GAS BURNER ASSEMBLY

FIELD OF THE INVENTION

This invention relates to gas-fired radiant generators and more particularly to a griddle-topped food cooking unit having one or more gas fired radiant heat generators.

BACKGROUND OF THE INVENTION

Radiant gas generators for cooking applications have been proposed in various combinations including deep fryers (U.S. Pat. No. 4,397,298) and ovens (U.S. Pat. No. 4,480,628). The burners or generators in these combinations are of the type in which the burner surface is defined by a ceramic tile structure including a plurality of parallel perforations in the tile structure and wherein a fuel gas mixture is burned at the upper surface of the tile structure to generate the radiant heat used in the cooking process. Whereas the radiant heat burners of the ceramic tile type have been generally satisfactory for general cooking applications, they suffer from the disadvantage that the generated heat tends to peak at the geometric center of the tile surface so that the overlying heating surface is relatively hot adjacent the center of the surface and relatively cool adjacent the perimeter of the surface with the result that the cooking performance of the heating surface varies considerably across the expanse of the heating surface. While this may not represent a problem in deep fryers and ovens, it may present considerable use problems in cooking on a griddle, especially in large batch quantities.

SUMMARY OF THE INVENTION

This invention is directed to the provision of a radiant gas burner assembly in which the temperature of a cooking surface heated by the burner is substantially uniform over the surface area thereof.

The radiant gas burner assembly of the invention comprises a griddle member defining a heat utilization surface; generator means defining a source of radiant heat spaced below the griddle member; a housing defining a closed chamber above the generator and below the heat utilization surface; and means for drawing heated effluent by convection to peripheral areas of the chamber beneath the griddle thereby to supplement or boost griddle temperature at the edges and corners for temperature uniformity. This arrangement has the effect of drawing the hot combustion effluent beneath the peripheral portions of the heat utilization surface to minimize the temperature gradient across the heat utilization surface.

According to a further feature of the invention, the radiant heat burner surface is constructed so as to have a non-radiating center area so as to minimize the concentration of radiant energy in the central region of the griddle positioned to receive the energy and thereby reduce the heat gradient across the expanse of the heat utilization surface.

According to a further feature of the invention, the annular burner surface is defined by a ceramic tile structure including parallel perforations wherein the perforations adjacent the central region of the tile structure are blocked or non-existent, leaving the peripheral perforations open to define the actual radiating area.

According to a further feature of the invention, a plenum chamber is positioned below the ceramic tile structure; the casing is rectangular and coacts with the plenum chamber and upper planar member to define a sealed volume; a mixing tube passes through the front wall of the plenum chamber and constitutes the only entrance to the sealed volume; and openings are provided in a wall or walls of the housing, preferably adjacent the front and/or rear corners of the housing and constitute the only exit or exits from the sealed volume through an opening or openings which may be positioned to draw the hot effluent of combustion to griddle areas requiring heat boost for temperature uniformity. With this arrangement, an air/fuel mixture enters the sealed volume through the mixing tube and flows upwardly through the perforations in the ceramic tile structure for combustion at the upper face of the ceramic tile structure, whereafter the combustion effluent leaves the sealed volume through the exhaust openings of the casing. Hot combustion effluent is thus moved continuously and efficiently in the areas needed, under the heat utilization surface, to minimize the temperature gradient across that surface.

In one disclosed embodiment of the invention, the upper planar member comprises a griddle sealing the open upper end of the housing; the ceramic tile structure includes a plurality of individual perforated tiles positioned in side by side relation with the perforations in the central portion of the tile area blocked to define an annular burner surface at the perimeter of the tiles; and an exhaust conduit extends along the rear side wall of the casing and communicates with the two rear corners of the combustion chamber to facilitate the continuous removal of effluent from the combustion chamber through appropriate areas suitably positioned. In another embodiment, tiles are arranged in a closed figure around a central steel plate so that, again, the central portion of the overall burner area is non-radiating.

DETAILED DESCRIPTION OF THE PREFERRED EMBODIMENT

The embodiment of the invention shown in the drawing includes a griddle plate 10; a housing 12; independently controllable left and right generator assemblies 14 and 16; an exhaust conduit assembly 18; and a control assembly 20.

Figure 1:
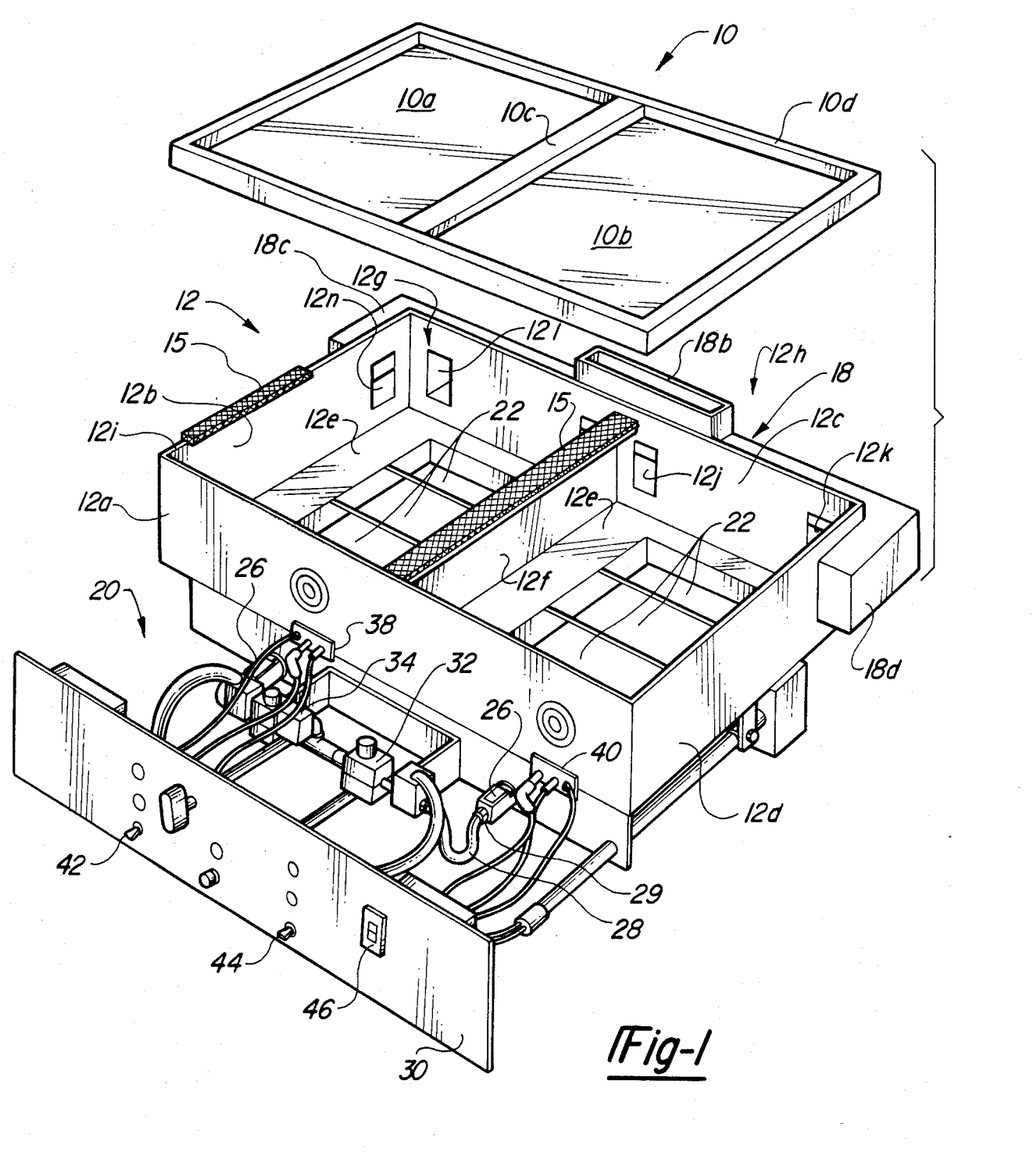
FIG. 1 is a perspective view of a gas fired radiant heat griddle according to the invention with the griddle plate exploded upwardly.

Griddle plate 10 includes a left portion 10a and a right portion 10b divided by a central rib 10c and including an outer peripheral lip or flange 10d extending totally around the griddle and defining a downwardly opening peripheral seat or groove 10e. Griddle 10 is preferably formed as a heavy cast aluminum member.

Housing 12 is preferably formed of 20 gauge aluminized steel and includes a front side wall 12a, a left side wall 12b, a back side wall 12c, a right side wall 12d, a bottom wall 12e, and a central partition 12f dividing the housing into a left compartment 12g and a right compartment 12h. Groove 10e of flange portion 10d of griddle plate 10 fits sealingly over the upper edge 12i of the side wall of the casing and partition portion 10c sealingly engages housing partition 12f so that the griddle plate sealingly encloses the open upper end of the housing. To insure a good seal which is essential to the operation, a gasket 15 of woven ceramic tape is applied to the upper surfaces of 12a, 12b, 12c, 12d and to the central partition 12f. Gasket 15 or a seal of equal effectiveness is necessary to insure a positive draft in the burner venturi 26 hereinafter described and to avoid back pressure above the burner.

Figure 2:
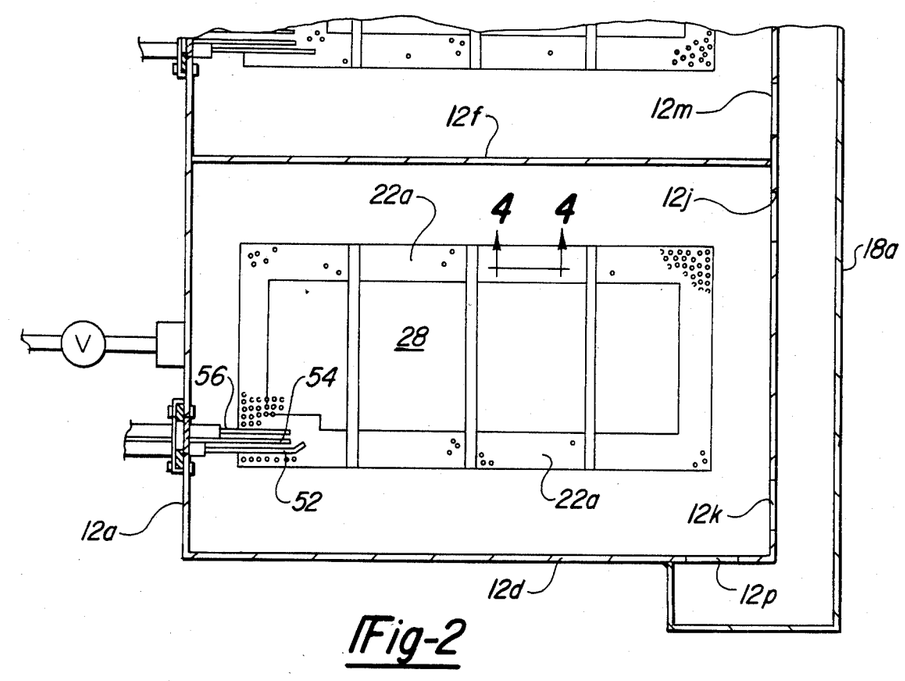
FIG. 2 is a fragmentary cross-sectional plan view of the griddle of FIG. 1.

Generator assemblies 14 and 16 are identical and are respectively disposed in the bottom wall of compartments 12g and 12h. Only generator assembly 16 will be described and it will be understood that assembly 14 may be identical to or the mirror image of assembly 16.

Generator 16 includes a plurality of contiguous and coplanar ceramic tiles 22, a plenum chamber 24, and a venturi mixing tube 26. Tiles 22 are arranged in side by side abutting relation and each include a plurality of perforations 27 (FIG. 4) extending from the bottom surface to the top surface of the tile. There may, for example, be 200 perforations per square inch of tile surface with each perforation having a diameter of 0.05 inches so that approximately ⅓ of the surface area of the tile constitutes open area. The central area of the assembled tiles is blocked by a layer of ceramic cement 28 applied in paste form to the undersurface of the assembled tiles so as to preclude upward movement of fuel air mixture through the perforations of the central area of the assembled tiles and allow the fuel air mixture to move upwardly through the perforations in the annular perimeter 22a of the assembled tiles; i.e., the only active burner area of the tiles is a rectangular perimeter strip 22a about 1¼" in width around the outside of the composite of tiles. It may be advantageous to vary the rectangular surface in certain instances or designs to obtain the required temperature uniformity. As a first alternative, the portions of the tiles which make up the blocked area may be left unperforated. As a second alternative, rectangular tiles may be placed around a central steel plate.

Figure 4:
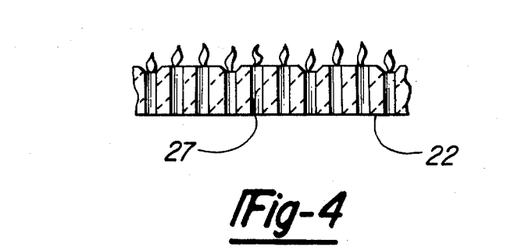

Plenum chamber 24 is defined as a dish like sheet metal structure underlying the assembled tiles and including a bottom wall 24a, side walls 24b, and an upper lip portion 24c coacting with the bottom 12e of the casing to define a groove 24d receiving peripheral flange portions 22b selectively provided at the external peripheries of the assembled tiles.

Figure 3:
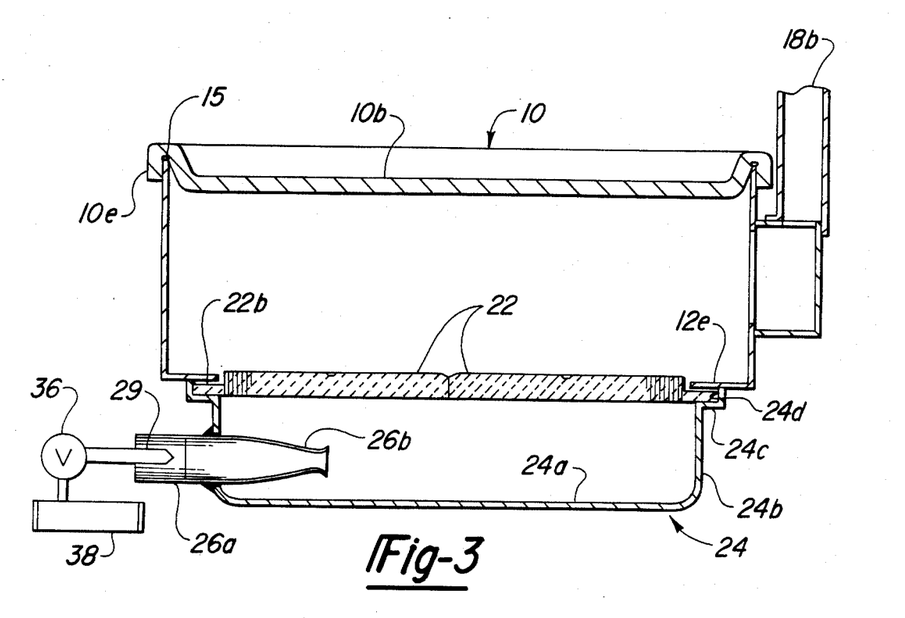
FIGS. 3 and 4 are cross-sectional views taken respectively on lines 3—3 and 4—4 of FIG. 2.

Mixing tube 26 extends through the front side wall of plenum chamber 24 and includes a main body portion 26a receiving a gas supply line 28 and a venturi portion 26b positioned within the plenum chamber and beneath the assembled tiles. Clearly, other forms of introducing the gas/air mixture into the burner can be used. Such, for example, as pressurized air mixing.

Exhaust conduit assembly 18 is formed of a suitable sheet metal material and includes a conduit 18a extending across the rear wall 12c of the housing and a central exhaust vent or stack 18b communicating centrally with conduit 18a. Conduit 18a communicates with the rear corners of griddle chamber 12h through openings 12j and 12k and with the rear corners of griddle chamber 12g through openings 12l and 12m. Conduit 18a further includes corner portions 18c and 18d respectively wrapping around the left rear corner of griddle chamber 12g and the right rear corner of griddle chamber 12h. Conduit portion 18c communicates with the left rear corner of chamber 12g through an opening 12n in casing side wall 12b, and conduit portion 18d communicates with the right rear corner of griddle chamber 12h through an opening 12p in casing side wall 12d. The ducts are not necessarily limited in position to that shown. They may be disposed as desired to obtain the uniform temperature distribution desired and their location ties in with the shape and size of the radiant area to achieve the maximum uniformity.

Figure 5:
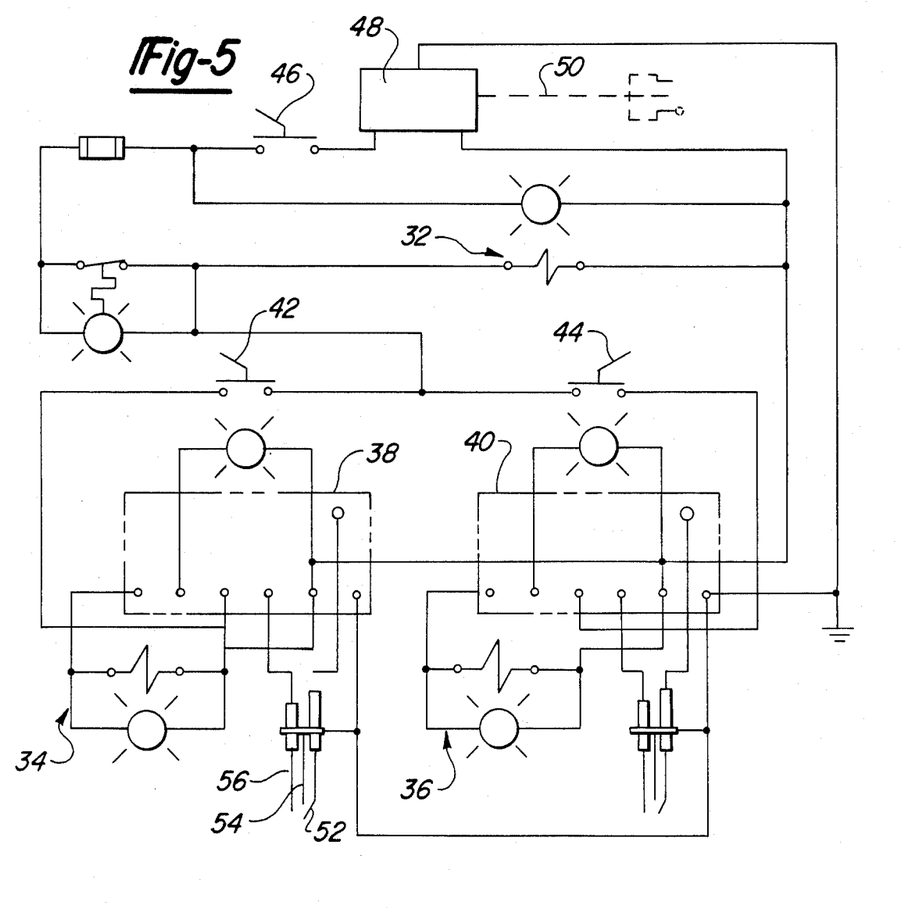
FIG. 5 is a schematic view of the control circuit for the griddle.

Control assembly 20 includes a control panel 30; a main solenoid valve 32; a left solenoid valve 34; a right solenoid valve 36; a left igniter assembly 38; a right igniter assembly 40; a left burner toggle switch 42; a right burner toggle switch 44; a main switch 46; and a junction box 48 receiving outside power through a suitable cable 50.

Each igniter assembly 38, 40 includes an igniter electrode 52 positioned over the exposed annular burner surface 22a of the assembled tiles, a ground electrode 54, and a flame probe or sensor electrode 56 also positioned over the annular burner surface 22a.

Figure 6:
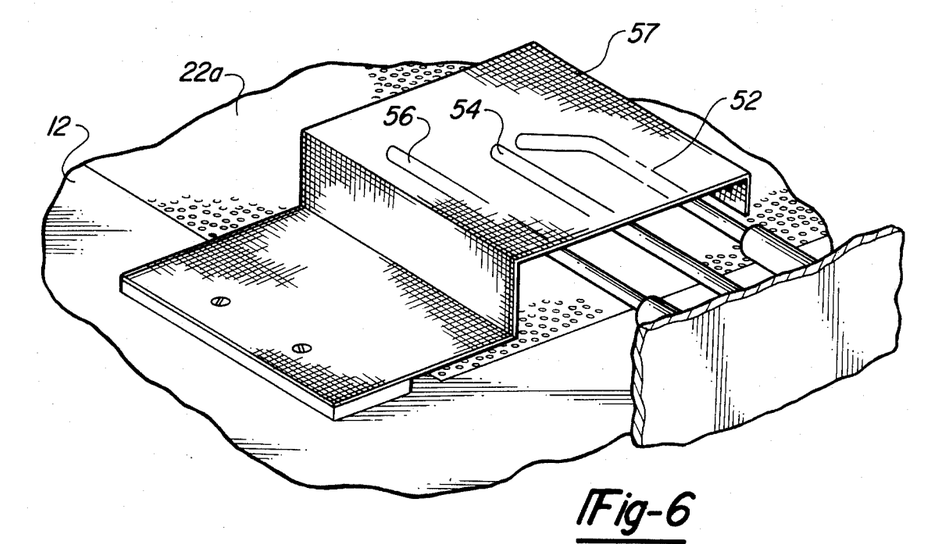
FIG. 6 is a perspective view of an igniter assembly with a ground screen.

If the burning area of the tile is severely limited with respect to the total area, the ground area can conveniently be increased by putting an Inconel mesh screen 57 over the electrode wire ends and grounding it to the housing with sheet metal screws as shown in FIG. 6. Exclusive of the screen 57, the igniter assembly 52, 54, 56 is a known device in which an alternating voltage of about 60 volts is applied between the electrode 56 and ground. The presence of a flame ionizes the air surrounding the electrode and rectifies the current flow to ground. This rectified dc current is sensed and employed to hold a relay open which continues gas flow. The screen 57 adds to the ground plane and improves the operation of the flame sensor during low temperature operation just after ignition.

In use, the griddle assembly is positioned within a suitable countertop (not shown) with the upper surface of the griddle plate 10 positioned generally flush with the countertop and with the control panel 30 positioned beneath the forward edge of the counter.

In operation, and assuming that it is desired to use the right hand griddle unit, main switch 46 is actuated and right hand burner control switch 44 is actuated to open solenoid valve 36 and supply gaseous fuel under pressure from a fuel source 58 through line 28 and nozzle 29 to mixing tube 26 where it unites with air flowing under natural aspiration through the annular entry space defined between the mixing tube and the nozzle and flows through venturi portion 26b into the plenum chamber beneath the tile assembly 22. The gas and air mixture then flows upwardly through the exposed perforations 27 in the annular burner area 22a to the top surface of the tiles where it is ignited by igniter electrode 52 coacting with ground wire 54. Ultimately the flame heats the tile cherry red to produce a radiant flame surface throughout the annular burner surface area 22a; i.e., the center is unheated and does not radiate.

The heat generated by the exposed burner surface 22a radiates upwardly to heat griddle portion 10b. The annular burner surface 22a underlying the griddle surface 10b has the effect of minimizing the temperature gradient across the griddle surface as compared to the gradient that would be established with a total area burner tile surface since the radiation intensity is a trigonometric function with the highest intensity occurring directly geometrically over the flame front and the intensity lessening in a direction away from the location immediately over the flame front by an amount corresponding to the cosine of the angle between the ray emanating directly upwardly from the flame and the ray emanating to the particular point in question on the griddle surface. Thus, rather than having a very high temperature in the center of the grill and a significant temperature gradient in all directions moving away from the center of the grill, the described annular burner surface has the effect of establishing a relatively uniform temperature across the expanse of the griddle surface.

The combustion effluents moving upwardly from the tile surface move rearwardly by convection beneath the griddle surface and exit from the chamber 12h through corner openings 12j, 12k and 12p for entry into conduit 18a and discharge through stack 18b. The hot effluents moving beneath the griddle surface and outwardly through the corners of the chamber 12h have the effect of boosting the heat at the perimeter and corner portions of the griddle to minimize the temperature gradient across the expanse of the griddle.

It will be seen that the housing 20, griddle 10, and plenum chamber 24 coact to define a sealed volume having only a single inlet constituted by the mixing tube 26 and a single outlet through the rear corners of the combustion chamber. This arrangement facilitates control of the combustion process and also has the effect of creating a strong, directed convection current flow beneath the griddle and out of the direct openings of the combustion chamber.

Griddles constructed in accordance with the present invention and incorporating the annular burner surface in combination with the described convection current flow provide a temperature gradient across the griddle surface of no more than 3 degrees F. as opposed to prior art designs in which temperature gradients of 50 degrees F. or more are commonly encountered across the expanse of the griddle surface.

Figure 7:
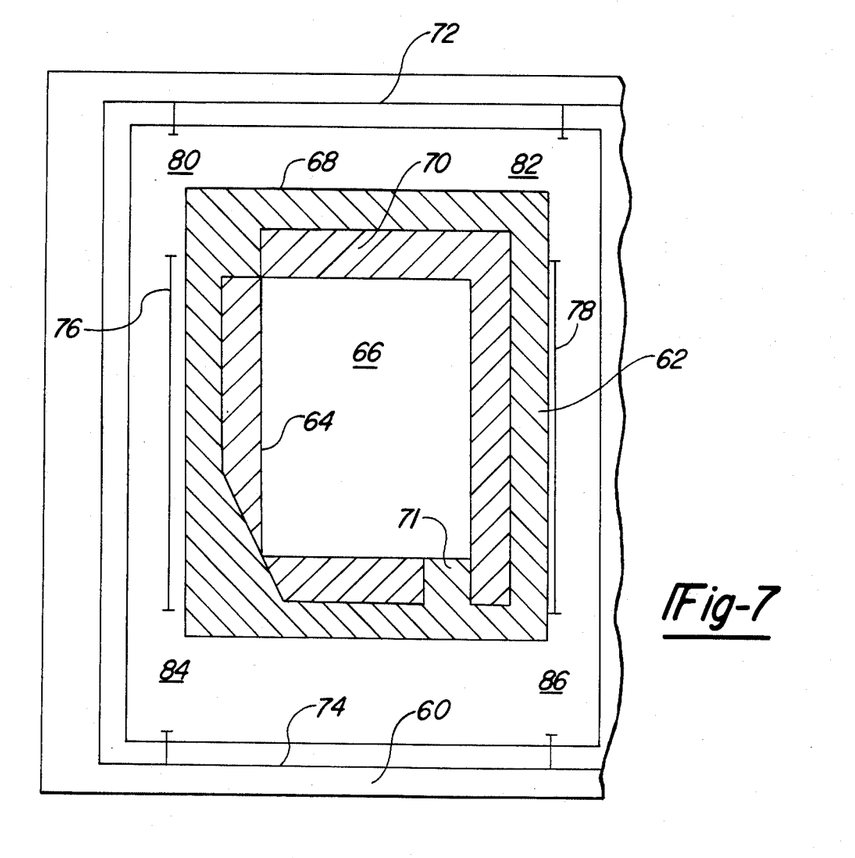
FIG. 7 is a plan view of an alternative generator surface arrangement.

Looking now to FIG. 7 an alternative embodiment of the invention particularly useful in connection with vary large griddle surfaces is disclosed. In the FIG. 7 embodiment one half of a double griddle arrangement is shown to comprise a housing 60 having an interior horizontal bulkhead 62 into which is sealingly installed a rectangular pattern 64 of individual rectangular or square burner tiles. The center area 66 is made of sheet steel just as the bulkhead floor area 64 is constructed of sheet steel. In this embodiment a good seal must be maintained around the entire peripheries, both inside and outside, of the pattern 64. Area 68 of the pattern 64 is perforated to permit the flow of the fuel air mixture through from the plenum which, as will be understood from the previous description lies below the plane of surfaces 62 and 66, through the burner tiles. Areas 70 are blocked off by paste as previously described. Area 71 is left unblocked to provide a location for the igniter and flame sensor electrodes 52, 54, 56.

The housing 60 further comprises walls 72, 74, 76 and 78 to define exhaust ports 80, 82, 84 and 86 of which ports 80 and 82 are located at the rear corners and ports 84 and 86 are located at the front corners. Again the location of the exhaust ports, although shown diagrammatically, is apparent from the planned view and differs from the foregoing embodiment primarily in the fact that ports 84 and 86 are located in the front corners of casing 60.

Figure 8:
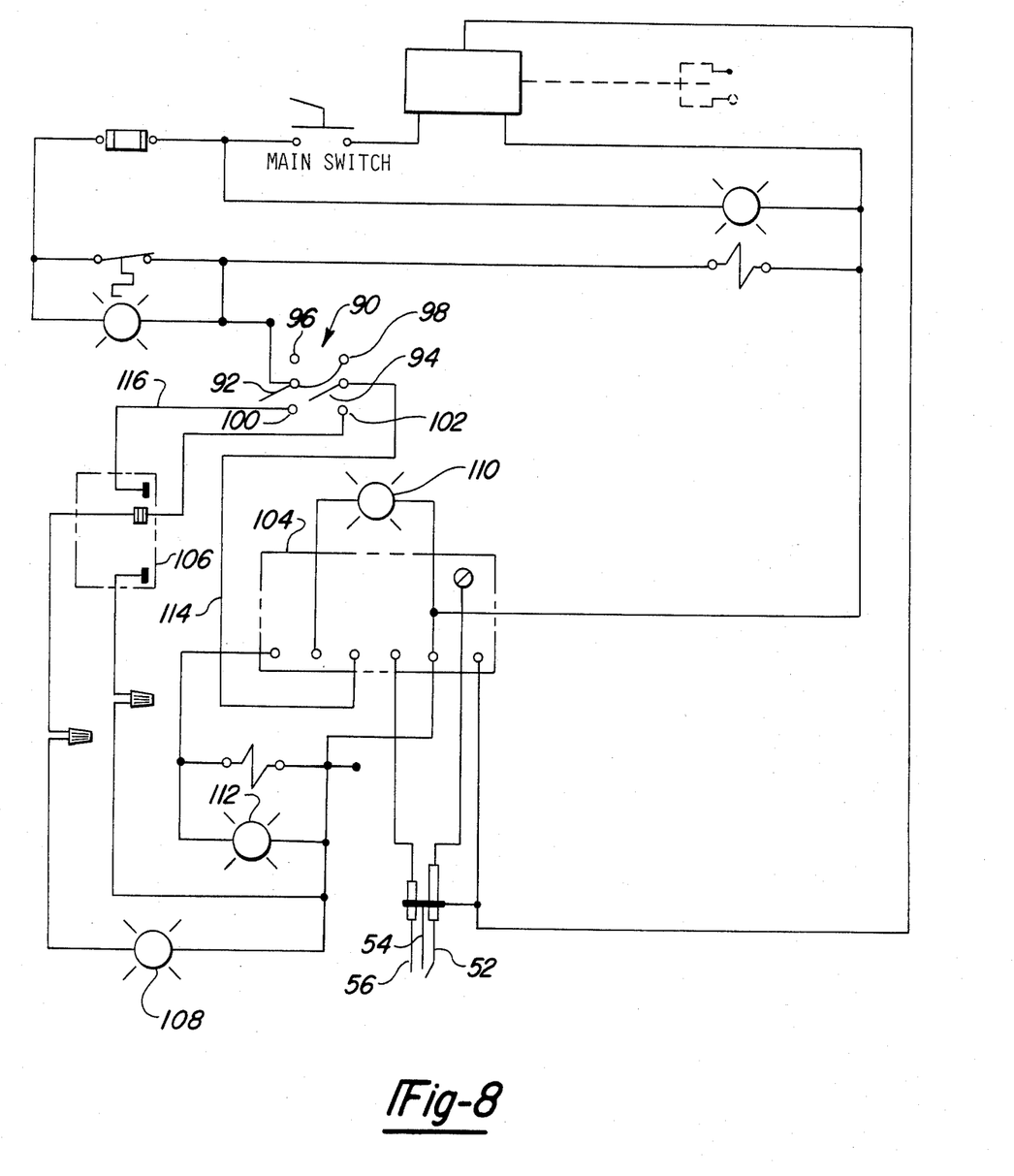
FIG. 8 is a circuit diagram for a device having a low temperature "hold" selector.

Referring now to FIG. 8 a second embodiment of the control circuitry is disclosed, the principal differences between the circuit of FIG. 8 and the circuit of FIG. 5 lying in the provision of a "hold" mode of burner operation wherein a low or intermediate temperature is maintained between full-on cooking times.

In this connection it will be noted that neither of the embodiments of FIGS. 5 nor 8 provides temperature control through gas valve modulation. Of course, the invention may be incorporated into a unit having such temperature control but it is believed preferable in certain applications to provide simple preset gas flow controls such that operator responsibility is reduced to the decision as to whether to turn the unit on or off or, in the case of the embodiment of FIG. 8, to place the unit in the low or intermediate temperature "hold" mode.

Looking specifically to the circuit diagram of FIG. 8 it will be noted that the switch 90 is a double throw double pole switch with center "OFF" position and is provided with switch elements 92 and 94. It will be appreciated that switch 90 corresponds in physical location with either of switch 42 or switch 44 of FIG. 1. Element 96 can be moved from the "off" position shown to a "cook" position where it contacts terminal 96 and to a "hold" position where it contacts terminal 100. Switch element 94 can be moved from the "off" position shown to a "cook" position corresponding to terminal 98 and to a "hold" position corresponding to terminal 102. Switch elements 92 and 94 are tied together so that they must move in synchronism.

The embodiment of FIG. 8 further includes the circuit board 104 which is essentially a sequencer to provide internal connections to the various elements of the circuit, and a timer 106. Additional elements which differ from the circuit of FIG. 5 include the "hold" light 108 which comes on when the switch 90 is placed in the "hold" position. A "purge" light 110 is provided to indicate that the sequencer of the circuit board 104, a known device, is in the 10 second purge mode; i.e., after the switch 90 is placed in either of the cook or hold positions, a relight sequence including a 10 second purge of the combustion chamber and a subsequent activation of the igniter electrodes 52, 54 and 56 is carried out in a manner well known and well understood by those skilled in the art. A light 112 is provided to show that the gas valve is actually open and the unit is heating.

When the switch 90 is in the "cook" position power is supplied directly to the circuit board 104 through terminal and 98 and line 114. Accordingly the circuit board operates to perform the purge cycle and thereafter supplies power to the igniter and maintains the gas valve in the open position as previously described. When the switch 90 is placed in the "hold" position, power is applied through terminal 100 to the timer 106 through line 116 and, from the timer 106 to the switch at terminal 102 to terminal 94 and thence, as before by line 114 to circuit board 104. Accordingly, in the "hold" position the circuit board 104 receives power only through the timer 106 and it is the function of the timer to establish a base cycle and to allow the gas valve and the burner to function only for a portion of the base cycle. For example, a base cycle 130 seconds may be established and a portion of 20 seconds may be set aside for activation of the burner, leaving 10 seconds for the purge as previously described. As a result the burner is on for 20 seconds out of every 130 seconds and this is a form of temperature control using time duration modulation.

Whereas preferred embodiments of the invention have been illustrated and described in detail, it will be apparent that various changes may be made in the disclosed embodiments without departing from the scope or spirit of the invention.

I claim:

1. A radiant gas burner assembly comprising:
   a planar metal member defining a heat utilization surface;
   generator means defining a radiant heat burner surface spaces substantially centrally of and below said planar member for directing radiant energy to said planar member as a primary heating source therefor;
   a housing defining a closed combustion chamber around and above said burner surface and peripherally around and below said heat utilization surface; and
   means for directing a current of combustion effluent to a peripheral location of said chamber to act as a secondary heating source for at least one peripheral portion of said planar member.

2. A radiant gas burner assembly according to claim 1 wherein:
   said burner surface is quadrangular.

3. A radiant gas burner assembly according to claim 2 wherein:
   said housing is open at the top and generally rectangular;
   said planar member comprises a griddle positioned over and upwardly closing said combustion chamber; and
   said directing means includes an exhaust conduit extending along at least one side wall of said housing and opening in said combustion chamber adjacent at least one corner of the chamber.

4. A radiant gas burner assembly according to claim 3 wherein:
   said radiant heat burner surface is defined at the upper surface of a ceramic tile structure including vertical perforations;
   said generator means further includes a plenum chamber beneath said ceramic tile structure and means for introducing a gas/air mixture into said plenum chamber for upward passage through said perforations and combustion at said burner surface at the upper surface of said ceramic tile structure; and
   the combustion effluent generated at said burner surface are drawn by convection laterally out of said combustion chamber and into said conduit at said openings 5. A radiant gas burner assembly according to claim 4 wherein:
   said gas/air mixture introducing means includes a mixing tube passing through the front wall of said plenum chamber; and
   said exhaust conduit extends along the rear side wall of said housing and communicates with the two rear corners of said combustion chamber.

6. A radiant gas burner assembly according to claim 5 wherein:
   said housing includes a bottom wall;
   said ceramic tile structure is sealingly positioned in said bottom wall centrally beneath said griddle; and
   said annular burner surface is produced by blocking the perforations in the central region of said ceramic tile structure while leaving the perforations in the annular periphery thereof exposed.

7. A radiant gas burner assembly according to claim 6 wherein:
   said ceramic tile structure includes a plurality of individual tiles positioned in side by side relation in said bottom wall of said housing.

8. A radiant gas burner assembly according to claim 5 wherein:
   said housing, griddle, and plenum chamber define a closed sealed volume having only a single entrance defined by said mixing tube and at least a single exit defined by an opening in said housing wall at the periphery of said combustion chamber.

9. A radiant gas burner assembly comprising:
   housing means defining a sealed column including an upper metal planar member defining a heat utilization surface and forming the upper boundary of said volume, a planar perforated ceramic tile structure to serve as a radiant heat source and positioned substantially centrally of and below said heat utilization surface to direct radiant energy toward said heat utilization surface, a plenum chamber positioned below said ceramic tile structure and defining the lower boundary of said volume, and side defining the lower boundary of said volume, and side walls of said volume above and around said ceramic tile structure;
   a mixing tube passing through the front wall of said plenum chamber and constituting the only entrance to said sealed volume; and
   at least one opening in a wall of said housing adjacent the periphery of said housing whereby combustion air entering said volume through said mixing tube in a gas/air mixture flows upwardly through the perforations in said ceramic tile structure for combustion at the upper face of said ceramic tile structure and thereafter directly toward said peripheral opening to serve as a secondary heat source for the heat utilization surface in the immediate area of said opening.

10. A radiant gas burner according to claim 9 and further including:
    an exhaust conduit extending along any side wall of said casing and communicating with said opening in said wall to provide an exhaust passage for said combustion effluent.

11. A radiant energy griddle apparatus comprising:
    a substantially planar metallic griddle member having a cooling area;
    means defining a chamber having a bottom wall, side walls and an open top; said griddle member being sealingly disposed on the chamber means to close said top;
    a radiant generator having a lower surface and a perforate active upper surface area disposed in spaced relation with the griddle member; said generator active surface area being substantially smaller than and wholly laterally inwardly spaced from the perimeter of said cooking area;
    plenum means adjacent the lower surface of said generator for receiving fuel and air for passage through the generator and into said chamber;

and exhaust means having at least one port at the periphery of the chamber and adjacent a periphery of said cooking area for drawing effluent from the radiant generator, along the lower surface of said griddle member to said port to supplementally heat the griddle member in the vicinity of said port.

12. An apparatus as defined in claim 11 wherein said active area defines at least a substantially closed figure having an inactive, nonradiating center.

13. Apparatus as defined in claim 11 wherein said active area is of non-uniform.

14. Apparatus as defined in claim 11 further including igniter and flame sensor means disposed above and adjacent said active surface, the combination further including a conductive mesh ground element disposed surroundingly and in spaced relationship to said igniter and flame sensor means and grounded to the housing means defining said chamber.

15. Apparatus as defined in claim 11 further including multiple exhaust ports at the peripheral corners of said chamber.

16. A radiant fired griddle comprising:
 a griddle member having a lower surface and an upper cooking surface;
 a support housing having peripheral walls terminating in an upper edge, said griddle member being sealingly disposed on said upper edge;
 a radiant generator forming a bottom wall of said chamber of said housing and being connected to said peripheral wall in sealed relationship, said generator comprising, in part, a perforate tile pattern and, in part, a non-radiating center portion;
 means for admitting fuel and air to the lower surface of the perforate tile pattern whereby said fuel and air passes into the chamber formed by the radiator, the peripheral wall and the griddle member;
 means for igniting said fuel and air mixture adjacent the surface of the tile pattern within said chamber thereby to activate the generator; and
 exhaust means formed in said wall at at least one peripheral location to force the flow of effluent from the active surface of the tile to a peripheral location to boost the temperature of the griddle member above said peripheral location thereby to promote temperature uniformity of said griddle member over the entire surface area thereof.

17. Apparatus as defined in claim 16 including valve means for supplying gas to the generator, switch means for turning said valve on and off, and modulator means for modulating the proportion of a basic time cycle during which said gas valve is on.

18. A radiant fired griddle apparatus comprising:
 a rigid metallic griddle having an upper cooking surface and a lower energy-receiving surface;
 a gas-fired, radiant energy generator disposed below and in spaced relationship to said energy-receiving surface;
 means for exhausting products of combustion from said generator;
 valve means for controlling the flow of combustible gas to the generator; and
 control means for operating said valve in a mode wherein said valve is opened for a predetermined portion of a repeating time cycle.

* * * * *